(12) United States Patent
Dhau et al.

(10) Patent No.: US 12,145,102 B2
(45) Date of Patent: Nov. 19, 2024

(54) AIR FILTER AND FILTER MEDIA THEREOF

(71) Applicant: Molekule, Inc., San Francisco, CA (US)

(72) Inventors: Jaspreet S. Dhau, San Francisco, CA (US); Dilip N. Goswami, San Francisco, CA (US); Philip Myers, San Francisco, CA (US)

(73) Assignee: Molekule, Inc., San Francisco, CA (US)

( * ) Notice: Subject to any disclaimer, the term of this patent is extended or adjusted under 35 U.S.C. 154(b) by 0 days.

(21) Appl. No.: 18/106,076

(22) Filed: Feb. 6, 2023

(65) Prior Publication Data

US 2023/0191323 A1 Jun. 22, 2023

Related U.S. Application Data

(63) Continuation of application No. 17/463,271, filed on Aug. 31, 2021, now Pat. No. 11,596,900.

(60) Provisional application No. 63/072,676, filed on Aug. 31, 2020.

(51) Int. Cl.
*B01J 19/08* (2006.01)
*B01D 53/00* (2006.01)
*B01D 53/86* (2006.01)
*F24F 8/22* (2021.01)

(52) U.S. Cl.
CPC ........... *B01D 53/86* (2013.01); *B01D 53/007* (2013.01); *F24F 8/22* (2021.01); *B01D 2255/802* (2013.01); *B01D 2257/302* (2013.01); *B01D 2257/40* (2013.01); *B01D 2257/708* (2013.01); *B01D 2259/804* (2013.01)

(58) Field of Classification Search
CPC .......... A61L 2/10; A61L 9/205; B01D 39/10; B01D 53/8668; B01J 23/63
USPC ..................................... 422/186.3; 204/157.3
See application file for complete search history.

(56) References Cited

U.S. PATENT DOCUMENTS

| | | | |
|---|---|---|---|
| 2,311,272 | A | 2/1943 | Ware |
| 4,065,276 | A | 12/1977 | Nakaya et al. |
| 4,896,590 | A | 1/1990 | Groos |
| 4,931,654 | A | 6/1990 | Horng |

(Continued)

FOREIGN PATENT DOCUMENTS

| | | |
|---|---|---|
| CN | 102794039 A | 11/2012 |
| CN | 105126836 A | 12/2015 |

(Continued)

OTHER PUBLICATIONS

"Molekule Air Pro FDA-Cleared Medical Air Purifier", First available Sep. 17, 2020[online], [site visited Dec. 14, 2021]. Available from u internet, https ://www.amazon.ca/Molekule-Technology-Allergens-Pollutants-Professional/dp/B08J9J396 N > (Year: 2020).

(Continued)

*Primary Examiner* — Monzer R Chorbaji
(74) *Attorney, Agent, or Firm* — Jeffrey Schox; Randy Mehlenbacher

(57) ABSTRACT

A filter media can include a fiber coated with a barrier coating that is substantially non-reactive to reactive species, and a photocatalytic coating disposed on the barrier coating, wherein the photocatalytic coating generates reactive species in response to illumination with optical radiation.

22 Claims, 6 Drawing Sheets

(56) References Cited

U.S. PATENT DOCUMENTS

| | | |
|---|---|---|
| D328,946 S | 8/1992 | Havrilla |
| 5,240,479 A | 8/1993 | Bachinski |
| D360,635 S | 7/1995 | Mark |
| D362,441 S | 9/1995 | Mark |
| 5,453,049 A | 9/1995 | Tillman et al. |
| 5,505,904 A | 4/1996 | Haidinger et al. |
| 5,620,669 A | 4/1997 | Plinke et al. |
| 5,709,735 A | 1/1998 | Midkiff et al. |
| 5,790,934 A | 8/1998 | Say et al. |
| D400,663 S | 11/1998 | Furlough |
| 5,873,920 A | 2/1999 | Wong et al. |
| 5,922,093 A | 7/1999 | James et al. |
| 5,933,702 A | 8/1999 | Goswami |
| 6,372,694 B1 | 4/2002 | Osinga et al. |
| 6,531,100 B1 | 3/2003 | Ogata et al. |
| 6,607,702 B1 | 8/2003 | Kang et al. |
| 6,613,277 B1 | 9/2003 | Monagan |
| D493,874 S | 8/2004 | Woods |
| D505,999 S | 6/2005 | Song |
| 6,939,397 B2 | 9/2005 | Nelsen et al. |
| 7,063,820 B2 | 6/2006 | Goswami |
| 7,074,369 B2 | 7/2006 | Tabatabaie-Raissi et al. |
| 7,160,506 B2 | 1/2007 | Deshpande |
| D552,724 S | 10/2007 | Chen |
| 7,291,205 B2 | 11/2007 | Chu |
| 7,371,351 B2 | 5/2008 | Goswami |
| 7,566,359 B2 | 7/2009 | Goel et al. |
| D611,579 S | 3/2010 | Zlotnik et al. |
| 7,786,033 B2 | 8/2010 | Marzolin et al. |
| 7,820,100 B2 | 10/2010 | Garfield et al. |
| 7,910,940 B2 | 3/2011 | Koike et al. |
| 8,003,058 B2 | 8/2011 | Bergeron et al. |
| D648,429 S | 11/2011 | Choi et al. |
| 8,048,391 B2 | 11/2011 | Molins |
| D652,408 S | 1/2012 | Chen |
| D687,017 S | 7/2013 | Ashcraft et al. |
| D697,496 S | 1/2014 | Ashcraft et al. |
| 8,658,046 B2 | 2/2014 | Barry et al. |
| 8,691,144 B2 | 4/2014 | Garfield et al. |
| 8,709,341 B2 | 4/2014 | Day et al. |
| D710,329 S | 8/2014 | Holzer |
| D716,427 S | 10/2014 | Lim et al. |
| D717,420 S | 11/2014 | Von Seggern |
| 8,951,376 B2 | 2/2015 | Rasmussen |
| D744,541 S | 12/2015 | Langhammer et al. |
| D752,732 S | 3/2016 | Ansley et al. |
| D754,832 S | 4/2016 | Seo et al. |
| D766,213 S | 9/2016 | Hinokio |
| D768,844 S | 10/2016 | Koseoglu et al. |
| 9,492,775 B2 | 11/2016 | Amsden et al. |
| D773,704 S | 12/2016 | Pardo et al. |
| D774,020 S | 12/2016 | Hinokio |
| 9,662,626 B2 | 5/2017 | Yates et al. |
| D796,019 S | 8/2017 | Thompson |
| D802,022 S | 11/2017 | Yao et al. |
| D803,369 S | 11/2017 | Kim et al. |
| D803,810 S | 11/2017 | Lee et al. |
| D804,002 S | 11/2017 | Huang |
| D805,622 S | 12/2017 | Lee |
| D806,843 S | 1/2018 | McDonnell |
| D807,327 S | 1/2018 | Xiong |
| D808,927 S | 1/2018 | Schaal et al. |
| D810,049 S | 2/2018 | Lee et al. |
| D810,135 S | 2/2018 | Langhammer et al. |
| D810,137 S | 2/2018 | Tsang et al. |
| D810,265 S | 2/2018 | Chen |
| D810,266 S | 2/2018 | Li |
| 9,943,796 B2 | 4/2018 | Ptak et al. |
| D818,097 S | 5/2018 | Cho et al. |
| 10,039,852 B2 | 8/2018 | Yi et al. |
| D828,912 S | 9/2018 | Powell et al. |
| D829,312 S | 9/2018 | Riering-Czekalla et al. |
| D829,313 S | 9/2018 | Cho et al. |
| D829,314 S | 9/2018 | Cho et al. |
| D831,810 S | 10/2018 | Cho et al. |
| D831,811 S | 10/2018 | Cho et al. |
| D832,414 S | 10/2018 | Sharma et al. |
| 10,105,463 B2 | 10/2018 | Kim et al. |
| D834,694 S | 11/2018 | Walter et al. |
| 10,137,216 B2 | 11/2018 | Goswami et al. |
| D835,766 S | 12/2018 | Chen |
| D836,760 S | 12/2018 | Fredäng et al. |
| 10,183,187 B2 | 1/2019 | Li |
| D850,596 S | 6/2019 | Wu |
| D865,149 S | 10/2019 | Lin |
| D865,932 S | 11/2019 | Ha et al. |
| D870,870 S | 12/2019 | Copparstad et al. |
| 10,517,980 B2 | 12/2019 | Kim et al. |
| 10,549,268 B2 | 2/2020 | Ozaki et al. |
| D879,276 S | 3/2020 | King |
| 10,584,886 B2 | 3/2020 | Goswami et al. |
| D882,056 S | 4/2020 | Baillie et al. |
| 10,625,207 B2 | 4/2020 | Rao et al. |
| D884,138 S | 5/2020 | Chen |
| D884,860 S | 5/2020 | Zhang |
| D886,268 S | 6/2020 | Montagnino et al. |
| D886,272 S | 6/2020 | Yang et al. |
| D886,975 S | 6/2020 | Yang et al. |
| D888,919 S | 6/2020 | Riering-Czekalla et al. |
| D888,923 S | 6/2020 | Zhong |
| 10,684,027 B2 | 6/2020 | Goswami et al. |
| D906,501 S | 12/2020 | Lim |
| D912,793 S | 3/2021 | Riering-Czekalla et al. |
| D912,795 S | 3/2021 | Wang et al. |
| 10,981,102 B2 | 4/2021 | Trent et al. |
| D919,071 S | 5/2021 | Zheng |
| 11,097,525 B1 | 8/2021 | Dhau et al. |
| D935,590 S | 11/2021 | Xu |
| D935,591 S | 11/2021 | Xu |
| D951,419 S | 5/2022 | Ha et al. |
| D952,823 S | 5/2022 | Wu |
| 11,596,900 B2 | 3/2023 | Dhau et al. |
| 2002/0160913 A1 | 10/2002 | Sangiovanni et al. |
| 2003/0180200 A1 | 9/2003 | Reisfeld |
| 2004/0007000 A1 | 1/2004 | Takeda et al. |
| 2004/0013583 A1 | 1/2004 | Burkhardt |
| 2004/0146437 A1 | 7/2004 | Arts et al. |
| 2004/0166037 A1 | 8/2004 | Youdell et al. |
| 2004/0262217 A1 | 12/2004 | Mori et al. |
| 2005/0061656 A1 | 3/2005 | Benoit et al. |
| 2005/0129591 A1 | 6/2005 | Wei et al. |
| 2005/0132682 A1 | 6/2005 | Paul |
| 2005/0138905 A1 | 6/2005 | Kubokawa |
| 2005/0193696 A1 | 9/2005 | Muller et al. |
| 2005/0201907 A1 | 9/2005 | Wakamura |
| 2006/0057020 A1 | 3/2006 | Tufo |
| 2006/0124442 A1 | 6/2006 | Valpey et al. |
| 2006/0150818 A1 | 7/2006 | Okamoto et al. |
| 2007/0034801 A1 | 2/2007 | Yokoi et al. |
| 2007/0041882 A1 | 2/2007 | Roseberry et al. |
| 2007/0059225 A1 | 3/2007 | Willette |
| 2007/0163588 A1 | 7/2007 | Hebrank et al. |
| 2007/0199288 A1 | 8/2007 | Paterson et al. |
| 2007/0253860 A1 | 11/2007 | Schroder |
| 2007/0289270 A1 | 12/2007 | Schumann et al. |
| 2007/0296035 A1 | 12/2007 | George et al. |
| 2008/0050288 A1 | 2/2008 | Okamoto et al. |
| 2008/0112845 A1 | 5/2008 | Dunn et al. |
| 2009/0002985 A1 | 1/2009 | Peck et al. |
| 2009/0010801 A1 | 1/2009 | Murphy et al. |
| 2009/0032390 A1 | 2/2009 | Osterlund |
| 2009/0041632 A1 | 2/2009 | Day et al. |
| 2009/0175757 A1 | 7/2009 | Yao et al. |
| 2009/0229478 A1 | 9/2009 | Wu |
| 2009/0245594 A1 | 10/2009 | Abramovich et al. |
| 2010/0003164 A1 | 1/2010 | Bourne et al. |
| 2010/0101413 A1 | 4/2010 | Jones et al. |
| 2010/0143205 A1 | 6/2010 | Engelhard |
| 2010/0196222 A1 | 8/2010 | Kosugi et al. |
| 2010/0196223 A1 | 8/2010 | Hay et al. |
| 2010/0260644 A1 | 10/2010 | Day et al. |
| 2010/0303678 A1 | 12/2010 | Lockhart et al. |
| 2011/0088375 A1 | 4/2011 | Suzuki et al. |
| 2011/0101712 A1 | 5/2011 | Laconte |

(56) References Cited

U.S. PATENT DOCUMENTS

| | | |
|---|---|---|
| 2011/0117002 A1 | 5/2011 | Dardas et al. |
| 2011/0203238 A1 | 8/2011 | Witter et al. |
| 2012/0077668 A1* | 3/2012 | Takada ................. C09D 183/14 |
| | | 502/158 |
| 2012/0161405 A1 | 6/2012 | Mohn et al. |
| 2012/0183443 A1 | 7/2012 | Hurley |
| 2012/0199005 A1 | 8/2012 | Koji et al. |
| 2012/0273340 A1 | 11/2012 | Felix |
| 2012/0301363 A1 | 11/2012 | Kim et al. |
| 2013/0036908 A1 | 2/2013 | Jones et al. |
| 2013/0294968 A1 | 11/2013 | Owen et al. |
| 2014/0131923 A1 | 5/2014 | Festner et al. |
| 2014/0271419 A1 | 9/2014 | Tsotsis et al. |
| 2014/0290489 A1 | 10/2014 | Uemura et al. |
| 2015/0008014 A1 | 1/2015 | Zhou et al. |
| 2015/0125355 A1 | 5/2015 | Lee et al. |
| 2015/0306271 A1 | 10/2015 | Willette |
| 2015/0320900 A1 | 11/2015 | Goswami et al. |
| 2015/0375187 A1 | 12/2015 | Yates et al. |
| 2016/0129432 A1* | 5/2016 | Ozaki ..................... B01J 23/72 |
| | | 502/309 |
| 2016/0279556 A1 | 9/2016 | Law |
| 2016/0367916 A1 | 12/2016 | Koehler |
| 2017/0043044 A1 | 2/2017 | Sobhy |
| 2017/0106218 A1 | 4/2017 | Lin et al. |
| 2017/0122605 A1 | 5/2017 | Lee et al. |
| 2017/0321717 A1 | 11/2017 | Park et al. |
| 2018/0001312 A1 | 1/2018 | Shibai et al. |
| 2018/0027809 A1 | 2/2018 | Chiattello et al. |
| 2018/0104374 A1 | 4/2018 | Kim et al. |
| 2018/0117511 A1 | 5/2018 | Yamauchi et al. |
| 2018/0221856 A1 | 8/2018 | Li et al. |
| 2018/0344890 A1 | 12/2018 | Watanabe et al. |
| 2019/0063763 A1 | 2/2019 | Kleinberger et al. |
| 2019/0083930 A1 | 3/2019 | Bernardoni et al. |
| 2019/0113246 A1 | 4/2019 | Goswami et al. |
| 2019/0120508 A1 | 4/2019 | Goswami et al. |
| 2019/0314751 A1 | 10/2019 | Cheng et al. |
| 2020/0061635 A1 | 2/2020 | Wiser et al. |
| 2020/0109869 A1 | 4/2020 | Mäkipääet al. |
| 2020/0129972 A1 | 4/2020 | Ozaki et al. |
| 2020/0182495 A1 | 6/2020 | Park et al. |
| 2020/0224892 A1 | 7/2020 | Yang et al. |
| 2020/0360858 A1 | 11/2020 | Mathur et al. |
| 2021/0222897 A1 | 7/2021 | Sanabria et al. |
| 2022/0062822 A1 | 3/2022 | Dhau et al. |
| 2024/0042418 A1 | 2/2024 | Dhau et al. |

FOREIGN PATENT DOCUMENTS

| | | |
|---|---|---|
| CN | 107096320 A | 8/2017 |
| CN | 107344043 A | 11/2017 |
| CN | 304684615 | 6/2018 |
| CN | 305656141 | 3/2020 |
| IN | 2993800001 | 11/2017 |
| JP | H0568820 A | 3/1993 |
| JP | 10-085558 A | 4/1998 |
| JP | H11505746 A | 5/1999 |
| JP | H11188085 A | 7/1999 |
| JP | 2001025668 A | 1/2001 |
| JP | 2001029441 A | 2/2001 |
| JP | 2001232154 A | 8/2001 |
| JP | 2002263175 A | 9/2002 |
| JP | 2002291856 A | 10/2002 |
| JP | 2003062414 A | 3/2003 |
| JP | 2003070885 A | 3/2003 |
| JP | 2007190533 A | 8/2007 |
| JP | 2008522822 A | 7/2008 |
| JP | 2016084946 A | 5/2016 |
| JP | 2016530908 A | 10/2016 |
| JP | 2017148484 A | 8/2017 |
| KR | 19990021845 A | 3/1999 |
| KR | 20130125190 A | 11/2013 |
| KR | 20180057394 A | 5/2018 |
| KR | 101977573 B1 | 5/2019 |
| WO | 9637281 A1 | 11/1996 |
| WO | 2004078320 A1 | 9/2004 |
| WO | 2006065491 A2 | 6/2006 |
| WO | 2015002324 A1 | 1/2015 |
| WO | 2015098386 A1 | 7/2015 |

OTHER PUBLICATIONS

"Molekule Air Purifier", found online—[Feb. 22, 2018]—https://molekule.com/?utm_source=google_search_search&utm_medium=rt&utm_campaign=brand&utm_term=term=molekule&utm_content=bmm_2&gclid=EAaIQobChMI5ufdtbK62QIViYjICh3d8gvEAYAASAAEgJcdPD_BwE.

"Molekule Website Screen Capture", from Jun. 10, 2016 by Wayback Machine, (Year: 2016).

"Molekule website screen grabs", from Wayback Machine Internet Archive. Jun. 10, 2016 (Year: 2016).

"Water-Based Adhesives-Information and Overview", https://www.hotmelt.com/blogs/blog/water-based-adhesives-information-and-overview.

Cao, Jinshan, et al., "Patterned nanofiber air filters with high optical transparency, robust mechanical strength, and effective PM2.5 capture capability", RSC Adv., 2020, 10, 20155.

Curtis, Gannon L., et al., "Reduction of Total and Viable Air Particles in the OR Setting by using Ultraviolet In-room Air Disinfection and Recirculation Units", American Association of Hip and Knee Surgeons, Cleveland Clinic, Nov. 4, 2017.

Darlrymple, Omatoyo K., et al., "A review of the mechanisms and modeling of photocatalytic disinfection", Applied Catalysis B.: Environmental 98 (2010) 27-38.

Evans, Hugh, "Adhesives: Understanding adhesives for filter fabrication", Filter Media Apr. 26, 2012, https://www.filtsep.com/filter%20media/features/adhesives-understanding-adhesives-for-filter/.

Henning, Laura M., et al., "Review on Polymeric, Inorganic, and Composite Materials for Air Filters: From Processing to Properties", DOI: 10.1002/aesr.202100005 Adv. Energy Sustainability Res. 2021, 2, 2100005.

Hou, Wenbo, et al., A review of surface plasmon resonance-enhanced photocatalysis, Advanced 4, 15 Functional Materials 23.13 (Apr. 5, 2013): 1612-1619. p. 1 col. 2 para 1, p. 2 col. 1 para 2.

Larzelere, John, "New and Novel Technologies in Particulate Filtration", https://apps.dtic.mil/sti/pdfs/ADA444770.pdf, 2006.

Liu, Chong, et al., "Transparent air filter for high-efficiency PM2.5 capture", Nature Communications, 6:6205, DOI: 10.1038/ncomms7205, published Feb. 16, 2015.

Marzocchi, Alfred, et al., "Glass Fibers and Their Use as Filter Media", Journal of the Air Pollution Association, Mar. 19, 2012.

Merrill, Reynold C., et al., "Chemistry of the soluble silicates", J. Chem. Educ. 1947, 24, 6, 262, Jun. 1, 1947, https://pubs.acs.org/doi/pdf/10.1021/ed024p262.

Neves, Ana I.S., et al., "Towards conductive textiles: coating polymeric fibers with graphene", Nature, Scientific Reports 7: 4250, Mar. 7, 2017.

Ochiai, Tsuyoshi, et al., Photoelectrochemical properties of TiO2 photocatalyst and its applications for environmental purification, Journal of Photochemistry and Photobiology C: Photochemistry reviews 13.4 (Dec. 1, 2012): 247-262.

Samburova, Vera, et al., "Dominant volatile organic compounds (VOCs) measured at four Cannabis growing facilities: Pilot study results", Journal of the Air & Waste Management Association, Sep. 9, 2019.

Wertz, John, et al., "Filtration media: Advantages of nanofibre coating technology", Filtration Seperation, Sep. 7, 2009.

\* cited by examiner

AIR FILTER AND FILTER MEDIA THEREOF

CROSS-REFERENCE TO RELATED APPLICATIONS

This application is a continuation of U.S. patent application Ser. No. 17/463,271 filed 31 Aug. 2021, which claims the benefit of U.S. Provisional Application No. 63/072,676, filed 31 Aug. 2020, each of which is incorporated in its entirety by this reference.

TECHNICAL FIELD

This invention relates generally to the fluid filtration field, and more specifically to a new and useful system and method in the fluid filtration field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
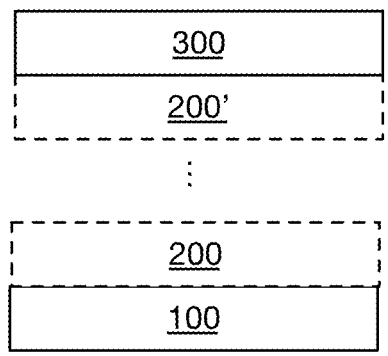
FIG. 1 is a schematic representation of the system.

As shown in FIG. 1, the filter media 10 can include a substrate 100 and photocatalytic material 300. The filter media can optionally include one or more coatings 200, 200'. The filter media can optionally be integrated into (e.g., mounted in, attached to, etc.) an air purifier, an HVAC system, a ventilation system, and/or any suitable fluid filtration or purification system.

The filter media 10 preferably functions to remove contaminants from a fluid (e.g., air, water, etc.). The filter media is preferably configured to degrade (e.g., destroy) the contaminants (e.g., oxidizing and/or reducing the contaminants into byproducts such as carbon dioxide and/or water), but can additionally or alternatively trap (e.g., capture) contaminants and/or otherwise remove contaminants from the fluid. Examples of contaminants can include: volatile organic compounds (VOCs, such as terpenes, aromatic compounds, aliphatic compounds, etc.), particulate matter (e.g., microparticles, mesoparticles, macroparticles, nanoparticles, etc.), organic matter (e.g., pollen, mold, spores, bacteria, viruses, etc.), inorganic matter (e.g., nitrogen oxides (NOx), sulfur oxides ($SO_x$), etc.), allergens (e.g., pet fur, dander, dust, etc.), and/or any suitable contaminants.

The filter media can be integrated into and/or used as a layer of a multilayer filter (e.g., as disclosed in U.S. patent application Ser. No. 16/523,928 entitled 'FLUID FILTRATION SYSTEM AND METHOD OF USE' filed on 26 Jul. 2019 which is incorporated in its entirety by this reference), used as a standalone filter media, and/or can otherwise be used and/or integrated into any suitable media.

Figure 9:
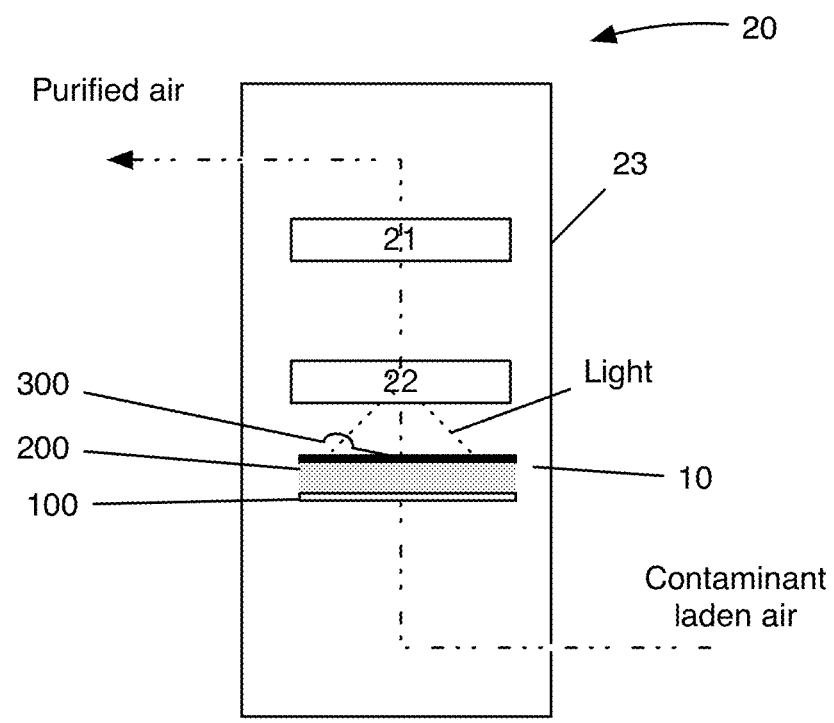
FIG. 9 is a schematic representation of an exemplary air filtration system.

In a preferred embodiment as shown for example in FIG. 9, the filter media can be incorporated into a fluid purification system 20. The fluid purification system can include a housing 23 that defines a lumen (e.g., including a fluid flow path, an inlet, and an outlet), a light source 22 (e.g., UV light source, visible light source such as incandescent sources, light emitting diodes, lasers, sunlight, fluorescent lamps, gas discharge lamps, phosphors, nonlinear sources, etc.) configured to illuminate photocatalytic material of the filter media, a support structure (e.g., to retain the filter media, the light source, etc.), an impeller 21 configured to urge fluid through the fluid purification system (e.g., along the fluid flow path), and/or any suitable components. The light source preferably illuminates the filter media with at least about 100 W/m2 (e.g., 100 $W/m^2$, 150 $W/m^2$, 200 $W/m^2$, 250 $W/m^2$, 300 $W/m^2$, 400 $W/m^2$, 500 $W/m^2$, 1000 $W/m^2$, 5000 $W/m^2$, values therebetween, >5000 $W/m^2$) of optical radiation (e.g., UV radiation such as UV-A, UV-B, and/or UV-C radiation; visible radiation; infrared radiation; etc.), but can illuminate the filter media and/or photocatalytic material thereof with less than 100 $W/m^2$ (e.g., <1 $W/m^2$, 1 $W/m^2$, 2 $W/m^2$, 5 $W/m^2$, 10 $W/m^2$, 20 $W/m^2$, 50 $W/m^2$, 100 $W/m^2$, etc.) of optical radiation. The light source can operate continuously and/or intermittently. For example, the light source can continually illuminate the filter media over a time span of minutes, hours, days, weeks, months, years, decades, and/or any suitable time span (e.g., without detecting filter or substrate degradation). In an illustrative example, an air purification system can be arranged as and/or include any components as disclosed in U.S. patent application Ser. No. 16/870,301 entitled 'SYSTEM AND METHOD FOR PHOTOELECTROCHEMICAL AIR PURIFICATION' filed on 8 May 2020 or U.S. patent application Ser. No. 17/152,690 entitled 'FLUID FILTRATION SYSTEM AND METHOD OF USE' filed on 19 Jan. 2021, each of which is incorporated in its entirety by this reference. However, the filter media can be used in isolation and/or in any system.

2. Benefits

Variations of the technology can confer several benefits and/or advantages.

Figure 5:
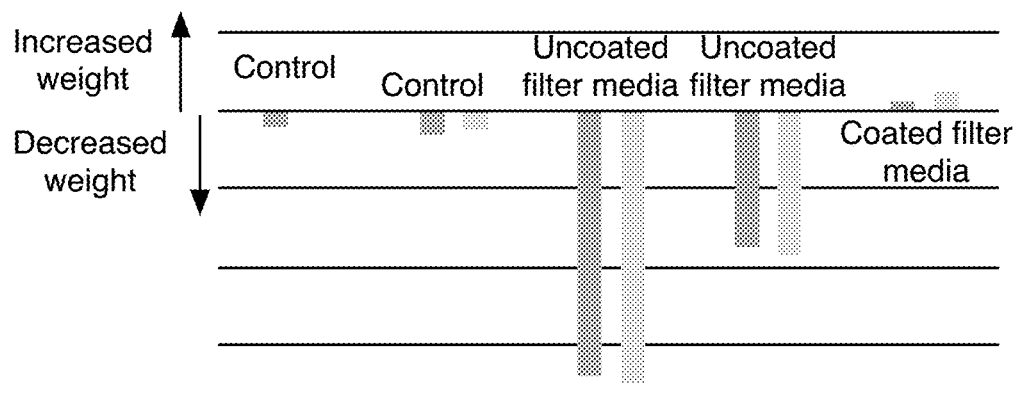
FIG. 5 is a graphical representation of an example percent weight change of control samples (e.g., made of filter media material), uncoated filter media including photocatalytic material, and coated filter media including photocatalytic material, each illuminated with ultraviolet radiation (e.g., substantially equivalent doses such as irradiance, duration, wavelength, etc.).

First, variations of the technology can increase the lifetime of the filter media and can enable less expensive filter substrates to be used (e.g., wherein conventional uses of such substrates in an uncoated manner would otherwise experience unacceptable levels of chemical and/or photochemical degradation). The lifetime of the filter media can be increased, for example, by hindering, slowing, and/or preventing degradation of substrates (e.g., polymeric substrates, natural fibers, synthetic organic materials, etc.) in reactive (e.g., oxidative) environments. In a specific example, as shown in FIG. 5, uncoated filter media exposed to reactive environments (e.g., in photocatalytic oxidation conditions) lose mass whereas coated (e.g., barrier coated) filter media exposed to substantially the same reactive environment are largely unaffected by the reactive environment (e.g., do not lose mass).

Second, variations of the technology can enable higher light source intensities to be apply and/or used to illuminate the photocatalytic material, which can improve an efficiency (e.g., kinetics of degradation, degree of degradation, single pass efficiency, time to achieve a target contaminant level within a given volume, etc.). For example, typically photocatalytic filters are operated at most with approximately 50 W/m$^2$ of illumination to extend a lifetime of the filter (e.g., to prevent degradation of the filter due to either direct reactions at the filter caused by light or indirect reactions initiated by the photocatalyst). Using a barrier coated or other filter media where the photocatalytic material is in contact with inorganic species, an illumination intensity that is greater than about 100 W/m$^2$ can be used (e.g., for extended periods of time such as months to years without observing significant breakdown or degradation of the filter).

Third, variations of the technology can enable biodegradable, photocatalytic filter media to be formed. The inventors have discovered that biodegradable fibers (e.g., made of a biodegradable polymer such as poly(lactic acid) (PLA), polycaprolactone, polybutylene succinate, polybutylene succinate adipate, aliphatic-aromatic copolyesters, polybutylene adipate/terephthalate, polymethylene adipate/terephthalate, etc.; cellulose; silk; wool; keratin; etc.) will rapidly break down when in proximity to active photocatalysts (e.g., illuminated photocatalysts). By applying a barrier coating to the biodegradable fiber protects (e.g., increases a lifetime of, hinders or prevents degradation of, etc.) the fiber from the photocatalytic material. At the end of life (e.g., due to poisoning of the photocatalyst, fiber degradation, filter clogging, etc.), the barrier coated fiber can be biodegraded (e.g., by crushing the filter media to expose the barrier coated fibers to a natural environment enabling the fibers to degrade). By using a barrier coating and/or photocatalytic material derived from minerals (e.g., silica, silicate, borate, sand, metal oxides, etc.), the filter media can be biodegradable (e.g., compostable). Variations of this example can form a completely biodegradable filter by using, in addition to biodegradable fibers, a biodegradable material (that is preferably barrier coated) as filter end caps. However, no end caps can be provided, recyclable end caps can be used (e.g., made of metal, glass, long-lived polymers, etc. such that the fibers can be removed and replaced within the end caps), and/or renewable and/or green filters can otherwise be formed.

However, variants of the technology can confer any other suitable benefits and/or advantages.

3. Filter Media

As shown in FIG. 1, the filter media 10 can include a substrate 100 and photocatalytic material 300. The filter media can optionally include one or more coatings 200, 200'. The filter media preferably functions to remove contaminants from a fluid.

The filter media 10 (and/or components thereof) is preferably configured to allow fluid (e.g., contaminant laden fluid) to pass through the media. For example, the filter media can be porous, include defined holes and/or channels for fluid to flow through, include a plurality of fibers (e.g., interwoven fibers), and/or have any suitable geometry or structure to promote fluid flow through the filter media (e.g., flow rate>0 m$^3$/s). However, the filter media can additionally or alternatively be configured to promote fluid flow over the surface of the media (e.g., configured to bring contaminants in contact with and/or proximity to photocatalytic material), and/or be otherwise configured. In variants, filters made with the filter media can have a minimum efficiency reporting value (MERV) score between 1-20. The MERV score can depend on the coating (e.g., the coating material, the coating thickness, the coating porosity, the coating structure, etc.), coating process, substrate (e.g., the substrate material fiber size, fiber density, etc.), the photocatalytic material (e.g., morphology, thickness, material, size, etc.), and/or otherwise depend on the filter media. In an illustrative example, the uncoated substrate can correspond to or be associated with a first MERV score (e.g., based on a porosity, pore size, fiber density, etc.) and the coated substrate can correspond to or be associated with a second MERV score (e.g., based on a coating thickness, based on a coating material, additives, etc.), where the second MERV score is higher than the first MERV score. However, the MERV score can be otherwise determined.

A broad face (e.g., surface) of the filter media can be pleated, smooth (e.g., flat), folded, ridged, puckered, curved, a mixture of features, and/or the broad face can have any suitable configuration. Preferably, all of the layers of the filter media have the same broad face configuration; however, each of the layers can have different broad face configurations (e.g., different sizes such as different pleating depth, different configurations, etc.), a subset of the layers can have the same broad face configuration, the layers can have a broad face configuration that depends on adjacent layers (e.g., layer type, layer broad face, layer contaminant removal mechanism, etc.), and/or any other suitable layer broad face configuration can be used. In a specific example, the pleating depth (e.g., average peak to trough size of the pleats), can be determined based on (e.g., vary directly or inversely with): filter media size, filter media surface area, the intended application (e.g., airflow filtration, oil filtration, water filtration, office filtration, home filtration, automobile, etc.), fluid flow rate, and/or any other suitable parameter. In examples, the pleating depth can be any depth (or range thereof) between 0.1 cm-50 cm, and/or have any other suitable depth. The pleat density can be: between 1-10 pleats per 100 mm or range thereof, 5 pleats per 100 mm, or any other suitable pleat density.

A form factor of the filter media can be cylindrical, hemispherical, planar (e.g., square, rectangular, circular, elliptical, oval, etc.), hemicylindrical, spherical, prismatoidal (e.g., being shaped like a cuboid, triangular prism, prismoid, etc.), toroidal, ellipsoidal, catenoidal, and/or have any other suitable geometry.

In some embodiments, the filter media (e.g., a substrate, coating, electrically conductive material, photocatalytic material, or other component thereof) can be electrostatically charged. This electrostatic charge can function to electrostatically attract contaminants to the filter media. The filter media is preferably positively charged (e.g., to attract negatively charged contaminants), but can be negatively charged (e.g., to attract positively charged contaminants), have regions of positive and negative charge, have a variable charge (e.g., be switchable between a positive and negative charge such as using an AC electric potential, which can have the benefit of reversibly storing and releasing contaminants to balance a contaminant load), and/or have a neutral charge. The electrostatic charge can be generated by the substrate, one or more coatings (e.g., a barrier coating, a dielectric coating, etc.), the photocatalytic material, and/or otherwise be generated. The electrostatic charge can be actively generated (e.g., by applying or maintaining an electric potential to a material) and/or passively generated (e.g., generated due to static electricity). In some variants, one or more additives can be included (e.g., in the substrate, in the coating(s)) to increase the duration and/or extent of charge build-up. Exemplary additives include: stearate, high dielectric materials (e.g., barium titanate $BaTiO_3$), mercaptobenzimidazolate salts, fatty acids, fatty acid amides, oleophobic surfactants, fluorochemical surfactants, oleophobic fluorochemical surfactants, and/or any suitable charge extending and/or enhancing additives can be used. In some variants, the electrostatic charge can be beneficial for the photocatalytic process, for example by increasing the lifetime of separated electrons and holes, by increasing a rate or efficiency of electron/hole separation, increase a rate and/or efficiency of generation of reactive species, and/or otherwise improve the photocatalytic process. However, the electrostatic charge may be detrimental to and/or not impact the photocatalytic process.

The substrate 100 preferably functions to support photocatalytic material 300. The substrate can additionally or alternatively capture (e.g., mechanically, electrostatically, etc.) one or more contaminants, conduct energy (e.g., electricity, heat, etc.), and/or perform any function. The substrate can be made of (e.g., composed of, composed essentially of, etc.) organic material (which can be beneficial for low-cost manufacturing processes and materials, are often lighter than inorganic materials, etc.), inorganic material (which can be beneficial for greater resistance to degradation), and/or combinations thereof (which can combine benefits of each material). The substrate can be fibrous (e.g., constructed of fibers 130 such as interwoven fibers, fibers as disclosed in U.S. patent application Ser. No. 17/074,368 entitled 'FLUID DISINFECTION DEVICE AND METHOD' filed on 19 Oct. 2020 which is incorporated in its entirety by this reference, etc.), porous, solid, and/or otherwise constructed. A fiber size (e.g., diameter, thickness, length, etc.) can be between about 1 μm and 100 cm (such as 1 μm, 2 μm, 5 μm, 10 μm, 20 μm, 50 μm, 100 μm, 200 μm, 500 μm, 1 mm, 2 mm, 5 mm, 1 cm, 2 cm, 5 cm, 10 cm, 20 cm, 50 cm, 100 cm, values therebetween), can be less than 1 μm, and/or greater than 100 cm.

Figure 6:
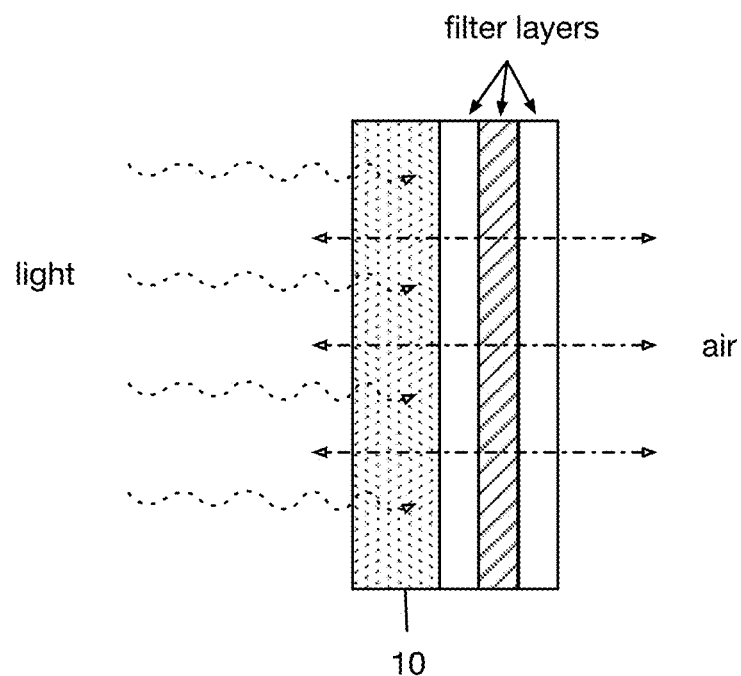
FIG. 6 is a schematic representation of an example of a filter media integrated into a multilayer filter.
Figure 7A:
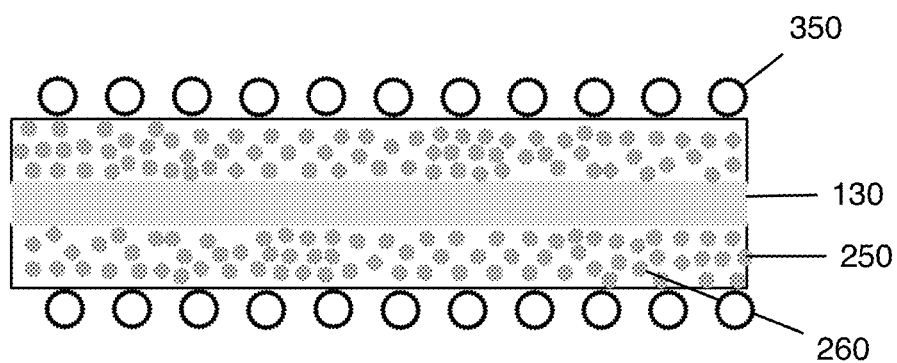
FIGS. 7A, 7B, 7C, and 7D are schematic representations of examples conductive material loading on a barrier coated fiber.
Figure 7B:
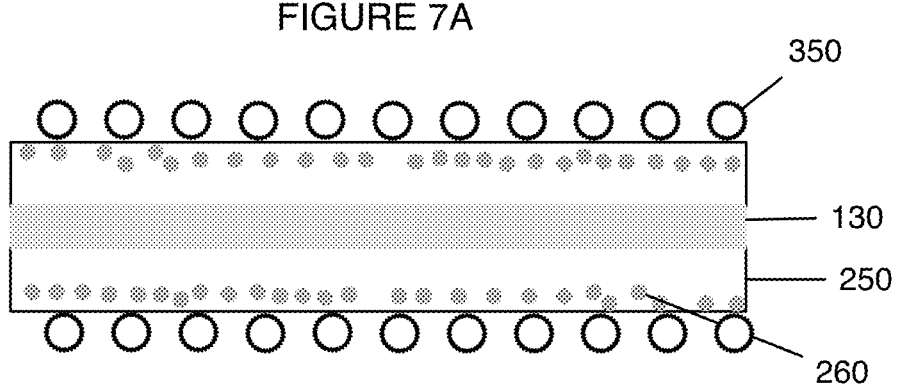
Figure 7C:
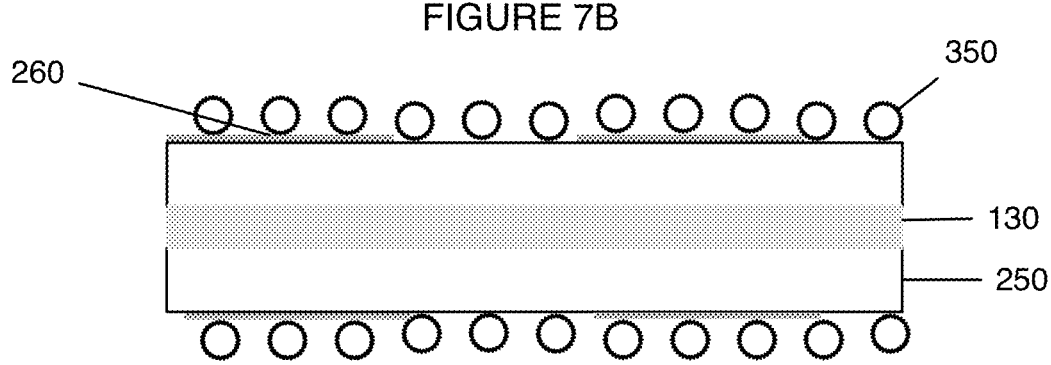
Figure 7D:
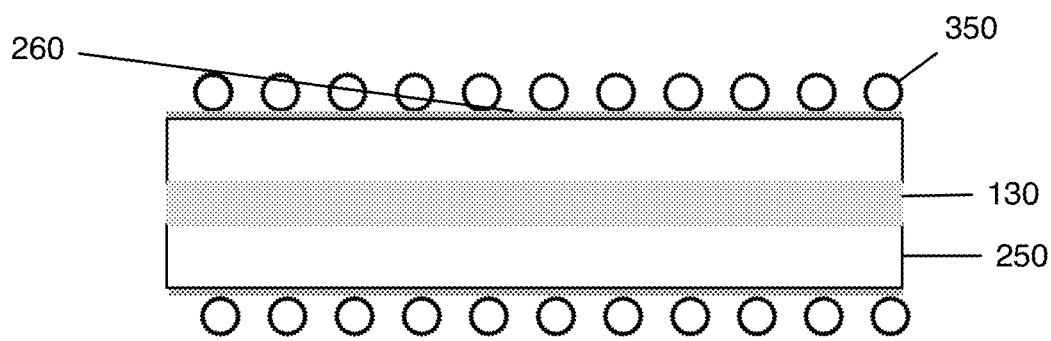

The substrate can be translucent (example shown in FIG. 6), transparent, opaque, or otherwise refract or scatter one or more light wavelengths (e.g., UV, IR, visible light, etc.). The substrate preferably transmits at least 20% of incident optical radiation (e.g., at least 30%, 40%, 50%, 60%, 70%, 80%, 90%, 95%, 97%, 99%, 99.5%, 99.9%, etc.) is transmitted through the substrate and/or fibers or other components thereof. This can be beneficial for increasing light penetration into and/or an intensity of optical radiation within the substrate which can enable photocatalytic material in the interior of the substrate can be illuminated and contribute to the photocatalytic reactions. For example, optical radiation (e.g., UV radiation, visible radiation, infrared radiation, etc.) can penetrate (e.g., retain at least a threshold irradiance such as at least 1 $W/m^2$, 2 $W/m^2$, 5 $W/m^2$, 10 $W/m^2$, 20 $W/m^2$, 50 $W/m^2$, 100 $W/m^2$, values therebetween, >100 $W/m^2$, <1 $W/m^2$, etc.) through at least 5% of the filter media thickness (e.g., 5%, 10%, 20%, 25%, 30%, 50%, 75%, 80%, 90%, 95%, 100%), can penetrate less than 5% of the filter media thickness, can penetrate a predetermined distance through the filter media (e.g., 100 μm, 200 μm, 500 μm, 1 mm, 2 mm, 5 mm, 1 cm, 2 cm, 5 cm, 10 cm, values therebetween, <100 μm, >10 cm, etc.), and/or through any suitable portion of the filter media. The penetration depth or distance can depend on a photocatalyst loading, photocatalyst scattering coefficient (e.g., absorption coefficient), substrate transparency or translucency, coating transparency or translucency, a wavelength of the optical radiation, and/or can otherwise depend on any suitable features or properties.

The substrate and/or constituents thereof can have a surface roughness between about 25 nm and 50 μm such as 25 nm, 50 nm, 100 nm, 200 nm, 500 nm, 1 μm, 2 μm, 5 μm, 10 μm, 20 μm, 50 μm, or values therebetween; a surface roughness less than 25 nm; a surface roughness greater than 50 μm; and/or any suitable surface roughness. In variants, a coating can increase a smoothness of the substrate (e.g., the coated substrate can have a smaller surface roughness than the uncoated substrate) and/or decrease a smoothness of the substrate (e.g., the resulting material can have a larger surface roughness than the underlying substrate). However, the coated substrate can have substantially the same surface roughness as the underlying substrate and/or any suitable surface roughness.

Examples of organic materials include: polymers (e.g., polypropylene (PP), polyethylene (PE), cellulose, poly(lactic acid), polycaprolactone, polybutylene succinate, polybutylene succinate adipate, aliphatic-aromatic copolyesters, polybutylene adipate/terephthalate, polymethylene adipate/terephthalate, poly(hydroxybutyrate), poly(hydroxyvalerate), polyhydroxyhexanoate, poly(hydroxyalkanoates), cyclic olefin copolymer (COC), poly (methyl methacrylate), polyamide-imide, polyimide, fluorinated ethylene propylene, styrene methyl methacrylate, perfluoropolymers, etc.), fabrics (e.g., woven fabrics, non-woven fabrics), paper, and/or any suitable organic material. Examples of inorganic materials include: glass (e.g., silica glass), metals (e.g., aluminium, steel, copper, zinc, nickel, etc.) and/or compounds thereof (e.g., metal oxides), ceramics, and/or any suitable inorganic materials. Embodiments of the substrate that include (e.g., are composed essentially of, consist essentially of, include to a substantial amount) one or more of: poly(lactic acid), polycaprolactone, polybutylene succinate, polybutylene succinate adipate, aliphatic-aromatic copolyesters, polybutylene adipate/terephthalate, polymethylene adipate/terephthalate, poly(hydroxybutyrate), poly (hydroxyvalerate), polyhydroxyhexanoate, poly(hydroxyalkanoates) and/or other suitable materials, can provide the benefit of forming a biodegradable substrate and/or filter media. Embodiments of the substrate that include (e.g., are composed essentially of, consist essentially of, include to a substantial amount) one or more of: cyclic olefin copolymer (COC), poly (methyl methacrylate), polyamide-imide, polyimide, Fluorinated Ethylene Propylene, Styrene Methyl methacrylate, perfluoropolymers, and/or other suitable materials can provide the benefit of forming a UV transparent substrate and/or filter media. However, any suitable polymers and/or combination of polymers can be used (e.g., to impart target chemical, mechanical, electrical, recyclability, etc. properties).

Figure 3A:
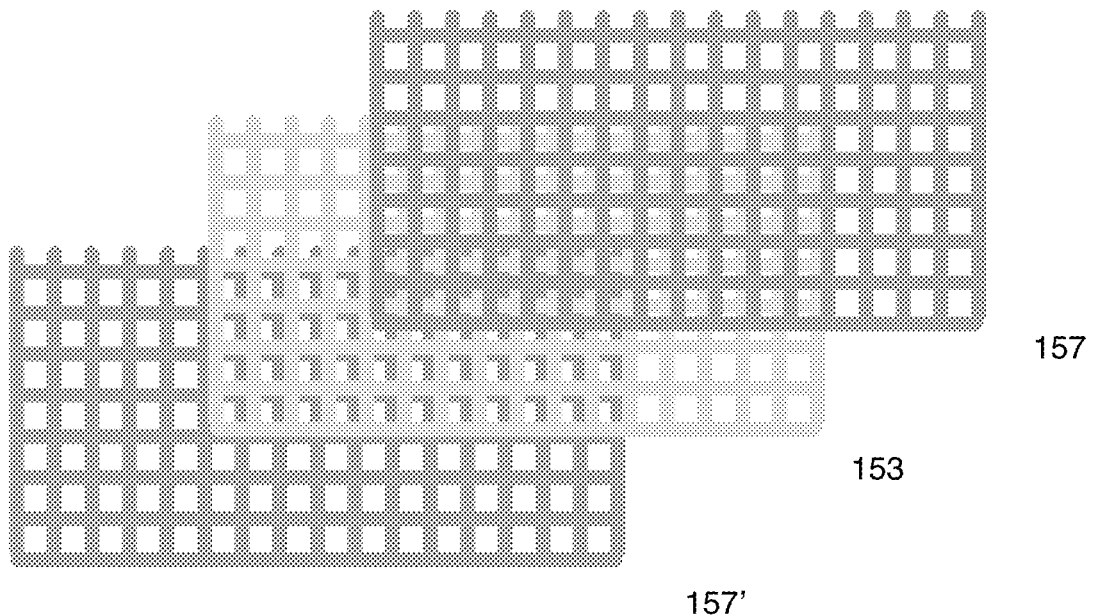
FIGS. 3A and 3B are schematic representations of examples of composite substrates.
Figure 3B:
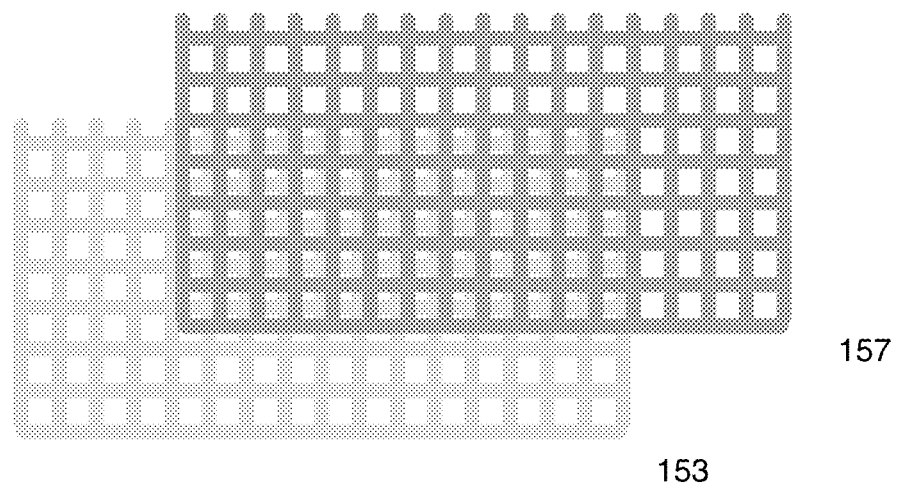

In variants including combinations of organic and inorganic materials, the organic and inorganic materials can be integrated (e.g., to form a composite material), layered (e.g., stacks of organic and/or inorganic materials in any order), and/or otherwise interfaced with each other. In a first illustrative example as shown in FIG. 3A, the substrate can include a first polymer layer 157 adjacent to (e.g., in contact with) a glass layer 153 (e.g., a first surface of the glass layer) which is adjacent to (e.g., in contact with) a second polymer layer 157' (e.g., at a second surface of the glass layer). The first and second polymer layers can be in contact or separated (e.g., by the glass layer) from one another. The first and second polymer layers can be or include the same or different polymer(s). In a second illustrative example, as shown in FIG. 3B, the substrate can include a glass layer 153 in contact with a polymer layer 157. In these illustrative examples, the polymer layer(s) can provide structural support to the glass layer (and/or filter media). However, the substrate can be otherwise arranged.

The optional coating(s) 200 can function to facilitate (e.g., improve) adherence of the photocatalyst to the substrate, modify the electrostatic properties of the substrate, hinder or prevent reactive species (e.g., contaminant, byproducts, reactive species generated by the photocatalyst, etc.) from contacting the substrate, increase a separation lifetime of electron/hole pairs, increase a rate or efficiency of separating electron/hole pairs, increase a lifetime of the substrate, and/or can perform any function. Coating(s) that hinder or prevent the reactive species from contacting or reacting with the substrate can be referred to as "barrier coatings." However, barrier coatings can be otherwise defined. The filter media can include one or more coatings. Each coating can be the same or different (e.g., perform the same of different functions).

The coating(s) can conformally coat the substrate (and/or the underlying constituents thereof) and/or underlying coating(s), coat in a pattern (e.g., regions with coating and regions without coating, regions with higher density of coating and regions with lower density of coating, based on a filter media structure, etc.), can nonconformally coat and/or can otherwise coat the substrate. The coating(s) can cover the entire exposed surface of the substrate and/or underlying coatings, a subset of the exposed surface of the substrate (e.g., specific materials of the substrate, specific locations of the substrate, etc.) and/or underlying coatings, a predetermined extent of the substrate and/or underlying coatings and/or otherwise cover the substrate and/or underlying coatings. For instance, each fiber (of a fibrous substrate) can be individually coated with the coating material, fibers can be coated together (e.g., sealing a gap or space between the fibers), a surface of each fiber can be coated (e.g., an upstream or downstream surface relative to a fluid flow direction, relative to an optical illumination direction, etc.), and/or the fiber(s) can otherwise be coated. At least one coating (e.g., the outermost coating of a coating stack) is preferably in contact with (e.g., touches) the photocatalytic material.

Figure 4A:
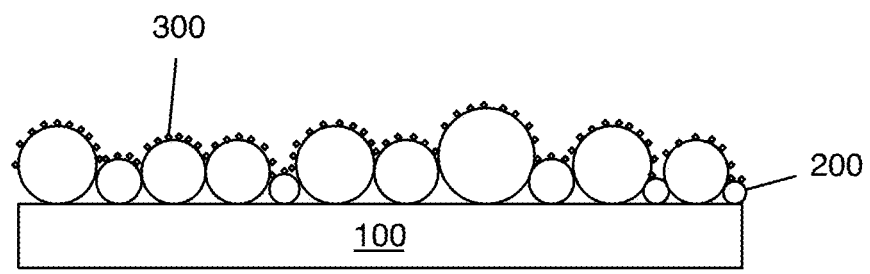
FIGS. 4A and 4B are schematic representations of examples of photocatalyst disposed on a coating disposed on a substrate.

The coating(s) can be uniform (e.g., vary in thickness and/or coverage across the substrate by at most about 20%, are smooth, etc.), nonuniform (e.g., are rough; have a characteristic surface roughness that is comparable to a characteristic size of the photocatalytic material; have a surface roughness between about 25 nm and 50 µm such as 25 nm, 50 nm, 100 nm, 200 nm, 500 nm, 1 µm, 2 µm, 5 µm, 10 µm, 20 µm, 50 µm, or values therebetween; surface roughness less than 25 nm; surface roughness greater than 50 µm; etc.), have a predetermined pattern or structural variation (e.g., matching and/or based on an illumination pattern), and/or otherwise cover the substrate. Nonuniform variants of the coating can function to increase the (exposed) surface area of the coating and can enable increased photocatalytic material loading and/or increase the number of reactive sites for interacting with contaminants. In an illustrative example, as shown in FIG. 4A, the coating can define a sand-like surface (e.g., a nonuniform surface made of many different sites with different thicknesses or sizes). However, the coating can define any suitable surface.

Figure 2:
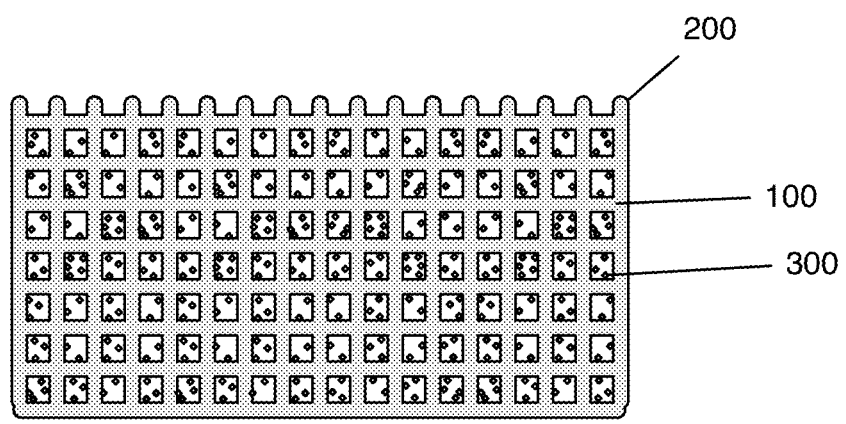
FIG. 2 is a schematic representation of an example of a cross section of a photocatalyst disposed on a coating disposed on a substrate.

Each coating can have any thickness between about 1 nm and 1 µm (such as 2 nm, 5 nm, 10 nm, 20 nm, 25 nm, 50 nm, 100 nm, 200 nm, 500 nm, values therebetween, etc.). However, one or more coatings can be thinner than 10 nm (e.g., to enable or impart a target optical absorbance or transmittance of the coating) or thicker than 1 µm. In some variants, for example as shown in FIG. 2, the thickness of the coatings (e.g., the total thickness of all the coatings, the thickness of a given coating, etc.) can be chosen to modify the porosity, pore size, MERV score, and/or other properties of the filter media. In a specific example, the coating thickness is preferably between about 10 nm (which can be beneficial to minimize or avoid pinholes or otherwise ensure that the coating fully protects or coats the underlying substrate and/or coatings) and 200 nm (which can be beneficial as thicker coatings can impact the mechanical properties of the substrate or coating, can be harder to work with, can be too rigid, etc.). In this specific example, the minimum and/or maximum coating thicknesses can depend on the substrate, on the coating (e.g., material), the coating process, a target coating property (e.g., transparency, optical absorption, electrical conductivity, mechanical property, flexibility, rigidity, etc.), and/or otherwise be determined.

In variants including more than one coating, coatings can be stacked (e.g., disposed on top of each other), adjacent to each other, overlapping, and/or otherwise be arranged. Each coating can be discrete, intermixed, embedded within another coating, and/or otherwise be related to each other.

The coating(s) are preferably barrier coatings 250 such as coatings that are substantially impervious to (e.g., do not react with, reacts less than a threshold amount with, react at a rate less than a threshold rate, etc.) and/or impenetrable to the fluid, contaminants, byproducts, reactive species, light, and/or other species that can be formed during and/or found in proximity to the filter media (e.g., during filter media use). In particular, the barrier coating is preferably resistant to (e.g., does not react with, reacts at a rate less than a threshold rate, forms a benign species upon reaction, does not react with at room temperature, does not react with at an operation temperature of the filter media, etc.) reactive oxygen species (e.g., superoxide, excited oxygen, oxygen radicals, ozone, etc.), hydroxyl radicals, hydrogen radicals, and/or other radical or ionic species that can be formed by the photocatalytic material. However, the coating(s) may be porous, and/or be otherwise permeable to the fluid, contaminants, byproducts, reactive species, and/or other species that can be formed during and/or found in proximity to the filter media.

The coating(s) are preferably transparent to UV radiation (e.g., transparent to radiations corresponding to wavelengths and/or ranges thereof between 100-400 nm). The coatings preferably transmit at least 50% (e.g., 60%, 70%, 80%, 90%, 95%, 99%, 99.9%, etc.) of UV radiation (e.g., light or optical radiation with a wavelength between 100-400 nm or any wavelength or subrange therein such as 315-400 nm, 250-315 nm, 100-250 nm, UV-A, UV-B, UV-C, etc.). However, the coatings can transmit less than 50% of UV radiation (e.g., 5%, 10%, 20%, 30%, 40%, 50%, etc.). However, the coating can additionally or alternatively scatter, reflect, absorb, and/or otherwise optically interact with the UV radiation. The coating(s) can be transparent to, translucent to, scatter, reflect, absorb, and/or otherwise optically interact with visible radiation (e.g., radiation with wavelengths between about 400 and 800 nm), infrared radiation (e.g., radiation with wavelengths greater than about 800 nm), and/or any suitable electromagnetic radiation.

Coating(s), particularly but not exclusively those in contact with photocatalytic material, are preferably inorganic (e.g., made of inorganic material, composed essentially of inorganic material, consist essentially of inorganic material, etc.), but can be organic (e.g., include organic material, include scavengers and/or other sacrificial species that preferentially react with reactive species generated proximal the photocatalyst), and/or composite (e.g., including organic and inorganic materials, include a mixture of organic materials, include a mixture of inorganic materials).

Examples of coating materials include: polymers (e.g., conductive polymers such as polyacetylene, polyphenylene vinylene, polypyrrole, polythiophene, polyaniline, polyphenylene sulfide, poly(3,4-ethylenedioxythiophene), Poly(4,4-dioctyl cyclopentadithiophene), etc.; insulating polymers such as cellulose, PE, PP, polyethylene terephthalate (PET), etc.; etc.), metals (e.g., aluminium, stainless steel, zinc, titanium, copper, nickel, etc.), metal oxides (e.g., transparent conductive oxides such as indium tin oxide (ITO), fluorine doped indium tin oxide (FTO), etc.; conductive oxides; semiconducting oxides such as titanium oxides, zinc oxides, etc.; insulating oxides; etc.), glass (e.g., liquid glass, silica, silicates, borosilicate, fused silica, borate glass, borates such as $B_2O_3$, etc.), zeolites, ceramics, inorganic carbon (e.g., graphite; graphene; fullerenes; carbon nanotubes such as semiconducting nanotubes, metallic nanotubes, combinations thereof, etc.), and/or any materials. However, any suitable coating material(s) can be used. In some variants, a coating (particularly but not exclusively glass or silicate coatings) can include (e.g., mixed, doped with, embedded with, etc.) boron oxides (e.g., boron trioxide $B_2O_3$, boron monoxide $B_2O$, boron suboxide $B_6O$, etc.), borates (e.g., diborate, triborate, tetraborate, etc.), and/or any suitable components or additives. In these variants, the amount of additive (e.g., borate, boron oxides, etc.) is preferably 1-20% (e.g., by weight, by mass, by volume, etc.), but can be less than 1% or greater than 20%.

One or more coatings can be electrically conductive (e.g., have an electrical conductivity meeting or exceeding a threshold conductivity), electrically insulating (e.g., have an electrical conductivity that is at most a threshold conductivity), dielectric, semiconducting, and/or have any suitable electrical properties.

In some embodiments, one or more coating can be oxidized (e.g., during operation, during manufacture, during shipping, during substrate coating, etc.). For example, metal coatings (such as Zn and/or Cu) can be oxidized to metal oxides (e.g., zinc oxide, copper oxide, semiconducting metal oxides, etc.; partially oxidized such as surface oxidation; etc.) which can in turn be photocatalytic (e.g., function as photocatalytic material such as described below) and/or function as antimicrobial agent.

In some embodiments, particularly but not exclusively when the filter media (e.g., substrate, coating) includes a polymeric material (such as PET), the substrate and/or coating(s) can be metallized (e.g., be doped with metal, include metal, include metal nanoparticles, reacted with a metal, electroless metal deposition, etc.), which can function to modify (e.g., increase) the electrical properties of the substrate and/or coating such as to prepare or provide an electrically-conductive coating (e.g. with electrically conductivity exceeding a threshold). In specific examples, the substrate and/or coating(s) can be metallized with (and/or the metallization process can be catalyzed by) a noble metal (e.g., copper, silver, gold), a transition metal, and/or any suitable metal. However, the coating (or substrate) can be intrinsically electrically conductive and/or the electrical conductivity or the coating can be otherwise modified.

The photocatalytic material 300 preferably functions to generate one or more reactive species to react with (e.g., oxidize, reduce) one or more contaminants in the fluid. Examples of reactive species include hydroxyl radicals, hydrogen radicals, reactive oxygen species (e.g., superoxide, excited oxygen, oxygen radicals, ozone, etc.), radical anions, radical cations, and/or any suitable reactive species. The photocatalytic material is preferably in contact with and/or proximal to (e.g., within a threshold distance of) only inorganic material of the substrate and/or coatings. However, the photocatalytic material can be in contact with and/or proximal to (e.g., within a threshold distance of) organic material and/or any suitable material of the substrate and/or coatings. The photocatalytic material can be disposed on a surface of the substrate and/or coating (e.g., a surface proximal a contaminant laden fluid, an external environment, etc.; as shown for example in FIG. 8A; etc.), integrated into the coating and/or substrate (e.g., intercalated into pores of the coating or substrate, as shown for example in FIG. 8B or 8C, etc.), located at an interface between a coating and the substrate, located at an interface between two coatings, and/or can be otherwise arranged.

The photocatalytic material can be coupled chemically (e.g., covalently bonded, ionically bonded, metallically bonded, via a coupling agent, etc.), physically (e.g., adsorbed, absorbed, electrostatically, magnetically, etc.), and/or otherwise be coupled to the substrate and/or coating(s). For example, the photocatalytic material can be embedded in a coating. In a second example, the photocatalytic material can be adhered to the coating such as using a binder (e.g., an inorganic binder, an organic binder, a binder and/or adhesive as disclosed in U.S. patent application Ser. No. 17/378,973 entitled 'FILTER MEDIA AND SYSTEM AND METHOD FOR MANUFACTURE THEREOF' filed on 19 Jul. 2021 which is incorporated in its entirety by this reference, etc.). However, the photocatalytic material can otherwise be coupled to the substrate and/or coatings.

The photocatalytic material is preferably, but does not have to be, coupled to an electrically conductive material.

Figures 8A, 8B, 8C:
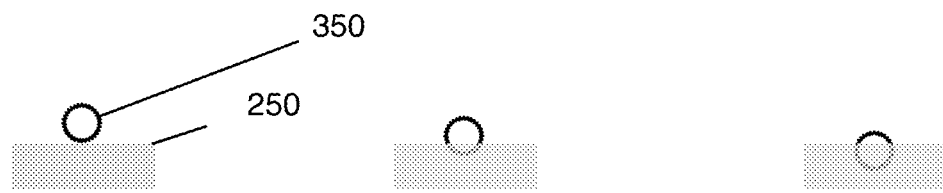
FIGS. 8A, 8B, and 8C are schematic representations of examples of disposing photocatalyst on a barrier coated fiber.

In variants where the photocatalytic material is embedded in a coating, at most about 10% (e.g., <0.1%, 0.1%, 0.5%, 1%, 2%, 2.5%, 3%, 5%, 7%, 9%, 10%, values therebetween, as shown for example in FIG. 8B, etc.) of the surface are of the photocatalytic material is preferably embedded in the coating. However, greater than 10% (e.g., 20%, 30%, 50%, 75%, 80%, 90%, 100%, values therebetween, etc.; as shown for example in FIG. 8C; etc.) of the surface area of the photocatalytic material can be embedded in the coating, photocatalytic material can be disposed on the coating (and/or substrate; as shown for example in FIG. 8A), and/or the photocatalytic material can otherwise be disposed on, in, or proximal a coating and/or substrate.

The photocatalytic materials can be provided as a film (e.g., thin film, thick film), quantum dots, nanostructures, nanocrystals, particles (e.g., nanoparticles, mesoparticles, microparticles, nanoporous particles, microporous particles, mesoporous particles, etc.), and/or in any suitable form factor. When the photocatalytic material is nanoscale (e.g., quantum dots, nanoparticles, nanocrystals, nanostructures, etc.), a characteristic size (e.g., diameter, length, width, height, distance between grains, etc.) of the photocatalytic material is preferably between about 25-50 nm, but can be smaller than 25 nm or greater than 50 nm. In some variants, particularly but not exclusively when nanoscale photocatalytic materials are used, the photocatalytic material can agglomerate, aggregate, and/or otherwise form clusters of photocatalytic material. The clusters of photocatalytic material are typically between about 300 nm and 500 µm in size, but can be smaller than 300 nm or larger than 500 µm. Cluster formation can be controlled (e.g., mitigated, hindered, enhanced, etc.) using surfactants, ultrasound, and/or other methods.

The photocatalytic materials are preferably photoelectrochemical oxidative (e.g., PECO) materials, but can additionally or alternatively be photoelectrochemical (PEC) materials, and/or any suitable photocatalytic materials. The photocatalytic material can include inorganic or organic species. The photocatalytic material can include (e.g., be made of) one or more of: titanium oxide, zinc oxide, sodium tantalite, carbonaceous materials (e.g., inorganic carbon such as carbon nanotubes, graphite, graphene, amorphous carbon, etc.; organic carbon such as polymers, surfactants, etc.; etc.), transition metals and metal oxide, and/or any suitable materials. For instance, the photocatalytic material can be composed or consist essentially of inorganic material(s). In specific examples, the photocatalytic materials can include and/or correspond to any suitable materials as disclosed in U.S. patent application Ser. No. 16/777,454 entitled "SYSTEM AND METHOD FOR PHOTOELECTROCHEMICAL AIR PURIFICATION" filed 30 Jan. 2020, and/or U.S. Pat. No. 7,635,450 entitled "PHOTOELECTROCHEMICAL AIR DISINFECTION" filed on 26 Apr. 2006 each of which is herein incorporated in its entirety by this reference. However, any photocatalytic material can be used.

The filter media preferably includes electrically conductive material 260 (e.g., a material with an electrical conductivity meeting or exceeding a threshold; material with a valance band that is higher than the valence band of the photocatalytic material, a material with a conduction band that is lower than the conduction band of the photocatalytic material; form a Type 1, Type 2, or Type 3 heterojunction with the photocatalytic material; form a metal-semiconductor junction with the photocatalytic material with a Schottky barrier less than a threshold such as approximately $k_BT$; etc.). The electrically conductive material can be embedded in a coating, embedded in the substrate, embedded in the photocatalytic material, disposed on a coating, disposed on the substrate, disposed on the photocatalytic material, form a coating (e.g., on another coating such as on a barrier coating, on the substrate, on the photocatalytic material, etc.), and/or can otherwise be disposed.

The electrically conductive material is preferably electrically coupled to the photocatalytic material, but can be electrically isolated from the photocatalytic material and/or otherwise be connected or disconnected from the photocatalytic material. For example, electrically conductive material is preferably within a threshold distance (e.g., 1 nm, 2 nm, 5 nm, 10 nm, etc. where distance can be an average distance, a maximum distance, an RMS distance, or other distance) of photocatalytic material. However, the electrically conductive material can be electrically coupled to the photocatalytic material in any manner (e.g., using wires, using electrically conductive paths, be within a Förster or FRET distance of the photocatalytic material, be within a dexter transfer distance of the photocatalytic material, be within a quantum tunneling range of the photocatalytic material, etc.).

The electrically conductive material can be homogeneously distributed and/or heterogeneously (e.g., inhomogeneously) distributed. As shown for example in FIGS. 7A-7D, electrically conductive material can be homogeneously distributed throughout a coating, heterogeneously distributed within a coating (e.g., proximal a surface of the coating where photocatalytic material is disposed, within a threshold distance of a surface of the coating, etc.), forms islands on the coating, be patterned on the coating (e.g., to match a structure of the filter media such as a pleating, to match an illumination pattern, etc.), and/or can otherwise be distributed.

The electrically conductive materials can be a film (e.g., thin film, thick film, etc.), particles (e.g., nanoparticles, mesoparticles, macroparticles, etc.; where a particle shape can be spheroidal, nonspheroidal, star, rod, tube, pyramidal, etc.), form islands (e.g., as shown for example in FIG. 7C), and/or have any suitable morphology. A characteristic size (e.g., thickness, diameter, radius, longitudinal extent, lateral extent, etc.) of the electrically conductive materials can be picoscale (e.g., <1 nm), nanoscale (e.g., between about 1-500 nm), mesoscale (e.g., between about 500-5000 nm), microscale (e.g., between about 1 µm and 100 µm), macroscale (e.g., >100 µm), span multiple size scales, and/or can be any suitable size. The electrically conductive materials can be amorphous, crystalline (e.g., monocrystalline, polycrystalline, etc.), glassy, and/or have any suitable packing density or structure.

The electrically conductive material preferably transmits (e.g., allows light to pass through, allows light to pass between or around adjacent electrically conductive material, etc.) at least 50% (e.g., 60%, 70%, 80%, 90%, 95%, 99%, 99.9%, etc.) of radiation (e.g., UV radiation with a wavelength between 100-400 nm or any wavelength or subrange therein such as 315-400 nm, 250-315 nm, 100-250 nm, UV-A, UV-B, UV-C, etc.; visible radiation with a wavelength or range thereof between about 400-800 nm; infrared radiation; etc.). However, the electrically conductive material can transmit less than 50% of UV radiation (e.g., 5%, 10%, 20%, 30%, 40%, 50%, etc.). The optical properties of the electrically conductive material can be achieved by tuning a characteristic size (e.g., thickness, radius, diameter, longitudinal extent, lateral extent, etc.) of the material, based on a material selection (e.g., specific material, mixture of materials, material doping, etc.), based on an area of coverage (e.g., a coverage density of the electrically conductive material), and/or can otherwise be determined. In a first illustrative example, a transparent or translucent conductive film can be formed by using a 10 nm (or thinner) silver film. In a second illustrative example, an inorganic carbon (e.g., graphene, carbon nanotubes, etc.) can be used to form a transparent or translucent conductive film. In a third illustrative example, a metallic grid can be used to form a transparent or translucent film (e.g., where light passes through gaps in the grid such that the percentage of the film that forms gaps is approximately equal to the percentage of light transmitted). In a fourth illustrative example, islands of electrically conductive material can be formed on the substrate and/or coating. The islands (e.g., nonconnecting patches, films, surfaces, etc. of electrically conductive material) preferably cover about 0%-50% of the underlying material and thereby allow 100%-50% of incident light to pass the island. However, the islands of material can cover any suitable portion of the surface. However, a transparent or translucent conductive material can otherwise be formed.

Examples of electrically conductive materials include: ITO, FTO, doped zinc oxide, copper, zinc, tin, aluminium, nickel, silver, gold, graphene, graphite, nanowire meshes, metal grids, carbon nanotubes, aluminium oxynitride, conductive polymers, topological insulators (e.g., where a surface of the material is electrically conductive), and/or any suitable conductive material(s) can be used.

The coatings can be made and/or the substrate can be coated using dip coating, spin coating, deposition (e.g., chemical vapor deposition, physical vapor deposition, etc.), spray coating, brushing, flow coating, electrolysis, electroplating, roll-to-roll coating processes, and/or using any suitable process. In some variants (for example to form islands and/or otherwise dispose electrically conductive material on a coating), a material can be physically embedded into a coating or the substrate (e.g., using polishing, grinding, impingement, etc.) followed by plating the material. In these variants, the physically embedded material can act analogously to a nucleation site to enable plating of the material when it may not typically be possible. In a specific example of this variant, metal particles (e.g., aluminium particles, copper particles, zinc particles, etc.) can be embed or implanted in a glass (e.g., silicate) coating. In this specific example, metal islands can be grown using electroplating (e.g., from the sites of the metal particle implantation or embedding), electrolytic deposition, and/or any suitable method.

The method of manufacture can include curing the coating and/or adhesives which can function to solidify, harden, improve a structural integrity of, improve a chemical resistance of, dry the coating and/or adhesive, and/or can otherwise function. Exemplary curing processes include: desiccation or dehydration (such as by providing or blowing dry air over a surface of the materials, applying a vacuum to the materials, heating the materials, etc.), annealing the materials, chemically treating the materials, radiatively treating the materials, and/or using any suitable curing or treatment process. The curing process can occur instantly (e.g., upon mixing or applying the curing process), after a curing time has elapsed (e.g., after the curing process has been performed for a curing time, with a delay after the curing process has been performed, etc.), and/or with any suitable timing.

In some embodiments, coatings, electrically conductive material, photocatalytic material, and/or any suitable materials can be added or applied before a prior layer or material has finished curing (e.g., annealing, before a full curing time has elapsed, etc.). These embodiments can function to embed, implant, and/or otherwise mix or incorporate materials into distinct layers. For example, while (such as after a predetermined time that is less than the curing time has passed) a glass (e.g., silicate) coating is being cured (e.g., hardening), photocatalytic particles 350 can be disposed on the glass coating which can embed (and/or adhere) the photocatalytic particles in the glass coating. The extent to which the photocatalytic particles are embedded can depend on the coating material, the photocatalytic material, the predetermined time, the time remaining before the curing time has elapsed, the curing method, and/or can otherwise be determined. Variations of this specific example can be used to embed electrically conductive material in a coating. However, materials (e.g., photocatalytic material, electrically conductive material, etc.) can be added contemporaneously with coating materials, and/or any suitable material(s) can be embedded in a coating in any manner.

The filter media can optionally include a frame, which can function to retain and/or support the filter media (e.g., to define a geometry or structure of the filter media). The frame can surround the filter media, surround a perimeter of the filter media, be adjacent to one or more edge of the filter media, and/or otherwise be related to a portion of the filter media. In a specific example, a frame for cylindrical filter media can be an end cap (e.g., one end cap on each end of the media such as a circular or annular end cap). The frame can be made of the same and/or different materials from the filter media. For instance, biodegradable polymers can be used to make the frame enabling a biodegradable filter (e.g., by using biodegradable polymers for the substrate). Similarly, UV transparent polymers could be used to make the frame enabling a UV transparent filter. Alternatively, UV-blocking polymers or materials can be used for the frame to prevent or hinder light from leaking out of the filter by the frame. However, the frame can be made of any suitable material(s).

3. Illustrative Examples

In a first illustrative example, the filter media can include an organic substrate coated with an electrically conductive coating (e.g., polymer coating, metallized coating, etc.), with photocatalytic material disposed on the electrically conductive coating (e.g., in contact with only the polymer coating).

In a second illustrative example, the filter media can include an organic substrate with a barrier coating (e.g., composed essentially of silica; made of another inorganic material), an electrically conductive coating (e.g., in contact with a surface of the barrier coating opposing the substrate, in contact with a surface of the barrier coating proximal the substrate, etc.), and photocatalytic material coupled to the electrically-conductive coating.

Figure 4B:
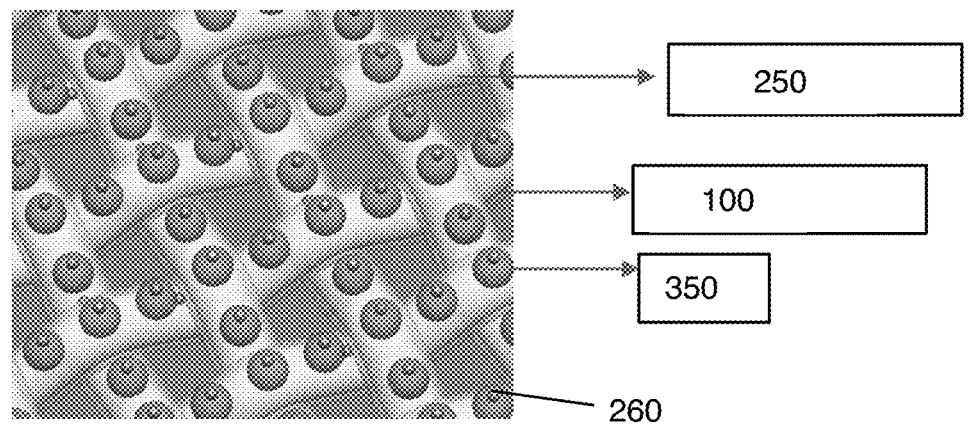

In a third illustrative example as shown in FIG. 4B, the filter media can include an organic substrate coated with a barrier coating, and photocatalytic material disposed on a surface of the barrier coating opposing the organic substrate.

In a fourth illustrative example, the filter media can include photocatalytic material disposed on an inorganic substrate.

In a fifth illustrative example, the filter media can include an inorganic substrate coated with an electrically conductive coating and photocatalytic material disposed on the electrically conductive coating.

In a sixth illustrative example, the filter media can include a composite substrate 150 including one or more glass layers 153 and one or more polymer layers 157 (e.g., PET, PP, etc.) and photocatalytic material. In this example, the photocatalytic material can be disposed on the glass layer(s) (e.g., only in contact with glass layers), the polymer layer(s) (e.g., only in contact with the polymer layers), and/or a combination thereof (e.g., in contact with both glass and polymer of the substrate).

In a seventh illustrative example, the filter media can include a composite substrate, a barrier coating (e.g., disposed on organic materials of the substrate such as polymeric layers, disposed on the entire substrate, etc.), and photocatalytic material (e.g., disposed on the barrier coating, disposed on the substrate, disposed only on inorganic constituents of the substrate, etc.). In related examples, the filter media can additionally or alternatively include an electrically conductive coating.

In an eighth illustrative example, the filter media can include a fibrous polymeric substrate, wherein a fiber of the substrate is coated with an inorganic barrier coating (e.g., a glass such as a silicate coating). Photocatalytic material (e.g., photocatalytic particles) can be disposed on the inorganic barrier coating. The inorganic barrier coating can be between about 10-200 nm thick and can be substantially uniform along the fiber. An electrically conductive coating can be included where the electrically conductive coating can be the same as the inorganic barrier coating, can coat the substrate, can coat the inorganic barrier coating, and/or can otherwise be disposed. In a variation of this specific example, the photocatalytic particles can be embedded in the inorganic barrier coating. At most 10% of the photocatalytic particle surface area is preferably embedded in the inorganic barrier coating.

In a ninth illustrative example, a filter media can include a fibrous polymeric substrate, wherein a fiber of the substrate is coated with an inorganic barrier coating (e.g., a glass such as a silicate coating). Photocatalytic material (e.g., photocatalytic particles) can be disposed on the inorganic barrier coating. The inorganic barrier coating can be between about 10-200 nm thick and can be substantially uniform along the fiber. An electrically conductive material (e.g., metal particles, nanotubes, inorganic carbon, etc.) can be included where the electrically conductive material can be disposed on the barrier coating, disposed on the substrate, disposed on the photocatalytic material, be embedded within the inorganic barrier coating (e.g., homogeneously distributed within, embedded within a threshold distance of a surface of the barrier coating or photocatalytic material, etc.), and/or can otherwise be arranged. In a variation of this specific example, the photocatalytic particles can be embedded in the inorganic barrier coating (e.g., in addition to the embedded electrically conductive material).

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A hybrid filter comprising:
   a photocatalytic layer comprising:
      a fibrous substrate wherein fibers of the fibrous substrate are coated with a barrier coating, wherein the fibers are composed essentially of a polymer, wherein the fibers are at least 80% transparent to UV-A optical radiation; and
      photocatalytic particles disposed on the barrier coating of the fibrous substrate; and
   a sorbent layer in contact with the photocatalytic layer, the sorbent layer comprising activated carbon disposed on a second substrate.

2. The hybrid filter of claim 1, wherein the sorbent layer is contacted to the photocatalytic layer using an adhesive.

3. The hybrid filter of claim 1, wherein the polymer comprises polymethyl methacrylate.

4. The hybrid filter of claim 1, wherein the barrier coating comprises a silicate glass.

5. The hybrid filter of claim 4, wherein the barrier coating is between about 10 and about 200 nm thick.

6. The hybrid filter of claim 4, where the barrier coating is inert to gas phase reactive oxygen species.

7. The hybrid filter of claim 1, wherein about 10% of a surface area of the photocatalyst particles is implanted in the barrier coating.

8. The hybrid filter of claim 1, wherein the fibrous substrate achieves a first MERV rating, wherein the photocatalytic layer achieves a second MERV rating, wherein the second MERV rating is greater than the first MERV rating.

9. The hybrid filter of claim 8, wherein the second MERV rating is at least 16.

10. The hybrid filter of claim 1, wherein the photocatalytic layer further comprises electrically conductive material in electrical contact with the photocatalytic particles, wherein the electrically conductive material is disposed on at most 50% of a surface area of the fibrous substrate.

11. A filter media comprising:
   a fibrous substrate, wherein fibers of the fibrous substrate are coated with a barrier coating that is inert to gaseous reactive oxygen species, wherein the fibrous substrate is at least 80% transparent to ultraviolet optical radiation; and
   photocatalytic particles disposed on the barrier coating, wherein the photocatalytic particles form reactive oxygen species in the presence of ultraviolet optical radiation.

12. The filter media of claim 11, further comprising a conductive material disposed on the barrier coating and in electrical communication with the photocatalytic particles.

13. The filter media of claim 12, wherein the conductive material comprises metal particles, wherein the metal particles cover at most 50% of a surface area of the fibrous substrate.

14. The filter media of claim 11, wherein a photocatalytic particle is implanted in the barrier coating, wherein at most 10% of a surface area of the photocatalytic particle is implanted in the barrier coating.

15. The filter media of claim 11, wherein the photocatalytic particle comprises at least one of anatase titanium dioxide, rutile titanium dioxide, sodium tantalite, or zinc oxide.

16. The filter media of claim 11, wherein the fibrous substrate comprises polymethylmethacrylate.

17. The filter media of claim 11, wherein a thickness of the barrier coating is between about 10 nm and about 200 nm.

18. The filter media of claim 17, wherein the barrier coating conformally coats the fibers of the fibrous substrate.

19. The filter media of claim 11, wherein the fibrous substrate and the photocatalytic particles cooperatively form a photocatalytic layer, the filter media further comprising a sorbent layer in contact with and distinct from the photocatalytic layer.

20. The filter media of claim 19, wherein the sorbent layer comprises a second substrate with activated carbon disposed on the second substrate.

21. The filter media of claim 19, wherein the sorbent layer is adhered to the photocatalytic layer.

22. The filter media of claim 11, wherein the fibrous substrate comprises a MERV score of at least 16.

* * * * *